W. W. DUNCAN & N. E. TOUSLEY.
METHOD OF VULCANIZING VULCANIZABLE ARTICLES.
APPLICATION FILED NOV. 17, 1910. RENEWED MAY 20, 1912.
1,048,138.
Patented Dec. 24, 1912.
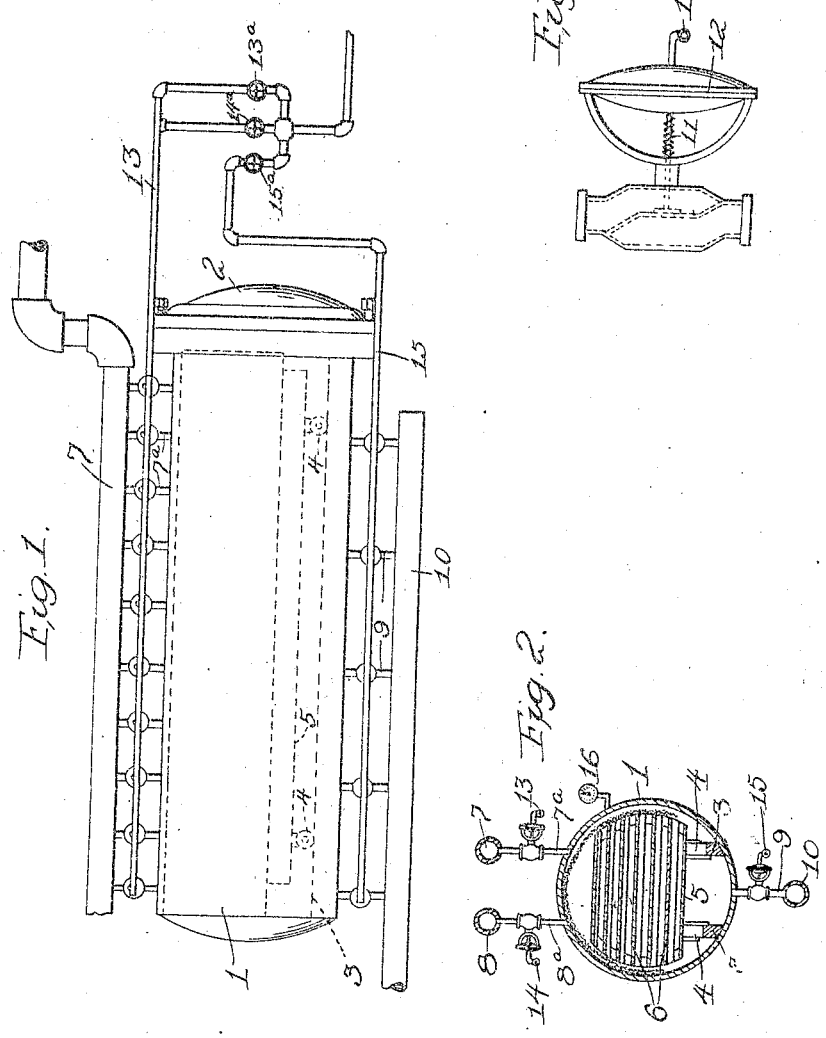

UNITED STATES PATENT OFFICE.

WILLIAM W. DUNCAN, OF BOSTON, AND NELSON E. TOUSLEY, OF WATERTOWN, MASSACHUSETTS, ASSIGNORS TO HOOD RUBBER COMPANY, A CORPORATION OF MASSACHUSETTS.

METHOD OF VULCANIZING VULCANIZABLE ARTICLES.

1,048,138.  Specification of Letters Patent.  Patented Dec. 24, 1912.

Application filed November 17, 1910, Serial No. 592,927. Renewed May 20, 1912. Serial No. 698,624.

*To all whom it may concern:*

Be it known that we, WILLIAM W. DUNCAN and NELSON E. TOUSLEY, citizens of the United States, residing at Boston and Watertown, Massachusetts, respectively, have invented certain new and useful Improvements in Methods of and Apparatus for Vulcanizing Vulcanizable Articles, of which the following is a specification.

Our present invention relates to improvements in the art of vulcanizing articles which are made of rubber or rubber and fabric upon formers or lasts, such, for instance, as rubber foot wear, and has for its object to shorten the vulcanizing period, reduce the cost, and, at the same time, secure the production of durable high grade articles free from all blisters and defects.

The invention includes the novel method of procedure and the apparatus for carrying out said method hereinafter described and particularly defined in the appended claims.

The apparatus for carrying out said method is illustrated in the accompanying drawings, in which—

Figure 1 is a side elevation; Fig. 2 is a transverse section; and Fig. 3 is a detail.

Referring by reference characters to this drawing, the numeral 1 designates a suitable chamber having a door 2 at one end designed to hermetically close the same. Within the chamber at the bottom are rails 3 upon which travel the wheels 4 of a truck 5 carrying racks 6 for the support of the formers or lasts.

7 designates a steam supply pipe which is connected with any suitable source of steam under pressure, and is provided with a plurality of branches 7ª connecting at different points with the interior of the chamber 1, preferably at the top thereof, and 8 designates an air supply pipe which is connected with any suitable source of heated air (not shown) designed to supply heated air under pressure to the chamber through the branch pipes 8ª. At the bottom of the chamber are provided a plurality of outlets 9 leading to a main outlet pipe 10. A large number of inlet branches are provided so that the steam and air may be introduced at a large number of points at once into the interior of the vulcanizing chamber, and it is preferable to have a plurality of outlets as shown, though there need not be as many outlets as inlets.

In order to operate the inlet pipes in unison with each other and also the outlet pipes, it is preferable to provide diaphragm valves such as shown in detail in Fig. 3, in which the spring pressed valve stems 11 are connected with expansible diaphragms 12 so arranged that by the admission of air or other motive fluid to a supply pipe common to all the valves, these valves will be opened in unison an amount dependent upon the pressure or amount of air admitted. A pipe 13 leads to the steam inlets, another pipe 14 to the air inlets, and a pipe 15 to the outlets, these pipes being controlled by valves 13ª, 14ª and 15ª, respectively.

Our improved method of operation in vulcanizing goods with this apparatus is as follows, the pressures and temperatures stated being those found preferable: The goods, made and assembled upon the lasts or forms in the ordinary manner, and varnished with the regular or any suitable varnish, are placed in the apparatus which is then hermetically closed. The air inlets are then opened and air heated to 280° F. is introduced until the pressure gage 16 indicates 60 pounds pressure. The air is retained in the chamber until the goods are heated to approximately 270° F. which usually requires about forty-five minutes, during which time the rubber is softened by the heat sufficiently to allow all stretch to be removed, whereby all danger of subsequent cracking in the vulcanized article is avoided. The air supply is then cut off and the steam inlet pipes opened, supplying steam at about 80 pounds pressure, and at the initial turning on of the steam, the outlet pipes are opened, allowing the steam to blow through to displace the air when, as soon as the air has been displaced, the outlets being closed, the goods are retained under dry steam at the pressure stated until vulcanization is complete. Just prior to the removal of the goods from the vulcanizer the steam supply is cut off, the outlet opened and the air supply turned on again, allowing the heated air to blow through to displace the steam.

The initial heating of the goods under pressure and by heated air prevents blistering of the goods and raises them to a sufficient temperature to prevent any condensation of steam thereon, and similarly the displacing of the steam by heated air before the vulcanizer is opened or the goods cooled prevents any final condensation of steam.

Having thus described our invention what we claim is:

1. The hereindescribed method of treating articles made of vulcanizable gums which consists in placing them in a hermetically closed chamber, supplying air under pressure to said chamber at a temperature such as to soften the rubber and remove the stretch, withdrawing the air and replacing it with steam under pressure, and finally replacing the steam with heated air after vulcanization is complete for preventing any final condensation of the steam upon the goods.

2. The hereindescribed method of treating articles made of vulcanizable gums, which consists in placing them in a hermetically closed chamber, subjecting them to heated air under pressure until the goods are raised to a temperature above that at which steam would condense thereon, replacing the air with steam under pressure, and at sufficient temperature to complete the vulcanization of the goods, and finally displacing the steam by previously heated air under pressure prior to removal of the goods, substantially as described.

3. The hereindescribed method of treating articles made from vulcanizable gums which consists in placing them in a hermetically closed chamber, supplying air to said chamber at not less than 60 pounds pressure, and 270° F., replacing the air by steam at not less than 80 pounds pressure and subjecting the goods to the action of the steam until vulcanization is complete, and finally replacing the steam with heated air, substantially as described.

In testimony whereof, we affix our signatures in presence of two witnesses.

WILLIAM W. DUNCAN.
NELSON E. TOUSLEY.

Witnesses:
J. B. MOTT,
E. E. ANDERSON.